US012691731B2

(12) United States Patent
Mlsna

(10) Patent No.: US 12,691,731 B2
(45) Date of Patent: Jul. 28, 2026

(54) VARIABLE SPEED COMPRESSOR CONTROL SCHEME FOR LUBRICANT CONTROL

(71) Applicant: THERMO KING LLC, Minneapolis, MN (US)

(72) Inventor: Eric S. Mlsna, Cashton, WI (US)

(73) Assignee: THERMO KING LLC, Minneapolis, MN (US)

( * ) Notice: Subject to any disclaimer, the term of this patent is extended or adjusted under 35 U.S.C. 154(b) by 100 days.

(21) Appl. No.: 18/740,019

(22) Filed: Jun. 11, 2024

(65) Prior Publication Data

US 2025/0376006 A1 Dec. 11, 2025

(51) Int. Cl.
 *B60H 1/32* (2006.01)
(52) U.S. Cl.
 CPC ......... *B60H 1/3232* (2013.01); *B60H 1/3208* (2013.01); *B60H 2001/3255* (2013.01)
(58) Field of Classification Search
 CPC ................ B60H 1/3232; B60H 1/3208; B60H 2001/3255
 See application file for complete search history.

(56) References Cited

U.S. PATENT DOCUMENTS

2017/0203633 A1* 7/2017 High .................... B60H 1/3232
2019/0346188 A1* 11/2019 Ishiyama .............. F25B 49/022
2023/0356567 A1 11/2023 Kim et al.

FOREIGN PATENT DOCUMENTS

CN 115593183 A 1/2023
DE 10321511 A1 11/2003
JP 2020148361 A * 9/2020

OTHER PUBLICATIONS

Kijima, Air Conditioner, Sep. 17, 2020, JP2020148361A, Whole Document (Year: 2020).*
Extended European Search Report and Written Opinion, International Patent Application No. 25181956.1, Nov. 3, 2025 (12 pages).

* cited by examiner

*Primary Examiner* — Larry L Furdge
(74) *Attorney, Agent, or Firm* — HSML P.C.

(57) ABSTRACT

A transport climate control system includes a controller. When a pulldown operation is scheduled or performed, the controller can incorporate operation in a lubricant recovery mode into the pulldown operation, and operate the transport climate control system to perform the pulldown operation including the operation in the lubricant recovery mode. The lubricant recovery mode can include operation under conditions such as mass flow rates, compressor speed and/or compressor capacity supporting lubricant circulation, so as to return lubricant to the sump.

18 Claims, 6 Drawing Sheets

VARIABLE SPEED COMPRESSOR CONTROL SCHEME FOR LUBRICANT CONTROL

FIELD

This disclosure is directed to transport climate control systems and the operation thereof, particularly the inclusion of a lubricant recovery operation into a pulldown operation.

BACKGROUND

A transport climate control system (TCS) can include, for example, a transport refrigeration system (TRS) and/or a heating, ventilation and air conditioning (HVAC) system. A TRS is generally used to control an environmental condition (e.g., temperature, humidity, air quality, and the like) within an internal space or cargo space of a transport unit (e.g., a trailer a truck, a container (such as a container on a flat car, an intermodal container, etc.), a box car, a semi-tractor, a bus, or other similar transport unit). The TRS can maintain environmental condition(s) of the internal space to maintain cargo (e.g., produce, frozen foods, pharmaceuticals, etc.) In some embodiments, the transport unit can include a HVAC system to control a climate within a passenger space of the vehicle.

A TCS can sometimes be operated with high-intensity startups for pulldown operations. These high-intensity startups can reduce the lubricant stored in a lubricant sump of the compressor of the TCS. Low capacity operations of the compressor may not be sufficient for subsequent lubricant recovery. Such pulldown operations can also be required following door openings at stops and other such events, and thus may be performed sequentially, thus causing further reduction in the lubricant present in the sump.

SUMMARY

This disclosure is directed to transport climate control systems and the operation thereof, particularly the inclusion of a lubricant recovery operation into a pulldown operation.

By incorporating a lubricant recovery period into a planned pulldown operation, a transport climate control system (TCS) can be operated at a state sufficient to return lubricant to the sump prior to shutdown or maintenance operations. This can ensure the level of the lubricant in the sump is returned to a suitable level prior to shutdown or maintenance, thereby preventing depletion of the sump from successive pulldown operations.

In one embodiment, a controller for a transport climate control system is configured to receive a temperature of a climate controlled space and a set point for the climate controlled space. The controller is further configured to generate a first prediction of a first time to achieve the set point based on the temperature of the climate controlled space and operation of the transport climate control system at a maximum capacity. The controller is also configured to generate a second prediction of a second time to achieve the set point based on the temperature of the climate controlled space and operation of the transport climate control system including a lubricant recovery operation. The lubricant recovery operation includes operating the transport climate control system at a selected capacity, the selected capacity being less than the maximum capacity and the selected capacity selected to return lubricant to a sump of the transport climate control system. The controller is also configured to operate the transport climate control system, wherein operating the transport climate control system includes the lubricant recovery operation.

In an embodiment, the lubricant recovery operation includes a compressor speed determined based on an oil circulation rate in the transport climate control system associated with said compressor speed.

In an embodiment, the controller is configured to operate the transport climate control system according to the lubricant recovery operation at an end of a pulldown operation.

In an embodiment, the controller is configured to interface with a variable speed drive of a compressor of the transport climate control system.

In an embodiment, the controller is further configured to receive an ambient temperature, the generating of the first prediction is further based on the ambient temperature, and the generating of the second prediction is further based on the ambient temperature.

In one embodiment, a transport climate control system includes a compressor and a controller. The controller is configured to receive a temperature of a climate controlled space and a set point for the climate controlled space. The controller is further configured to generate a first prediction of a first time to achieve the set point based on the temperature of the climate controlled space and operation of the transport climate control system at a maximum capacity. The controller is also configured to generate a second prediction of a second time to achieve the set point based on the temperature of the climate controlled space and operation of the transport climate control system including a lubricant recovery operation. The lubricant recovery operation includes operating the transport climate control system at a selected capacity, the selected capacity being less than the maximum capacity and the selected capacity selected to return lubricant to a sump of the transport climate control system. The controller is further configured to operate the transport climate control system, where operating the transport climate control system includes the lubricant recovery operation.

In an embodiment, the transport climate control system further includes an evaporator, an expander, and a condenser.

In an embodiment, the compressor is a variable-speed compressor. In an embodiment, the lubricant recovery operation includes operating the compressor at a compressor speed determined based on an oil circulation rate in the transport climate control system associated with said compressor speed. In an embodiment, the controller is configured to interface with a variable speed drive of the compressor.

In an embodiment, the controller is configured to operate the transport climate control system according to the lubricant recovery operation at an end of a pulldown operation.

In an embodiment, the controller is further configured to receive an ambient temperature, the generating of the first prediction is further based on the ambient temperature, and the generating of the second prediction is further based on the ambient temperature.

In one embodiment, a method of controlling a transport climate control system includes receiving, at a controller, a temperature of a climate controlled space and a set point for the climate controlled space. The method further includes generating, using the controller, a first prediction of a first time to achieve the set point based on the temperature of the climate controlled space and operation of the transport climate control system at a maximum capacity. The method also includes generating, using the controller, a second prediction of a second time to achieve the set point based on the temperature of the climate controlled space and operation of the transport climate control system including a lubricant recovery operation. The lubricant recovery operation includes operating the transport climate control system at a selected capacity, the selected capacity being less than the maximum capacity and the selected capacity selected to return lubricant to a sump of the transport climate control system. The method further includes operating the transport climate control system, where operating the transport climate control system includes the lubricant recovery operation.

In an embodiment, the lubricant recovery operation includes operating the compressor at a compressor speed determined based on an oil circulation rate in the transport climate control system associated with said compressor speed. In an embodiment, operating the transport climate control system includes the controller interfacing with a variable speed drive of a compressor of the transport climate control system so as to direct operation of the compressor at the compressor speed.

In an embodiment, the lubricant recovery operation is performed at an end of a pulldown operation.

In an embodiment, the method further includes receiving, at the controller, an ambient temperature. In the method, generating the first prediction is further based on the ambient temperature, and generating the second prediction is further based on the ambient temperature.

DETAILED DESCRIPTION

This disclosure is directed to transport climate control systems and the operation thereof, particularly the inclusion of a lubricant recovery operation into a pulldown operation.

Figure 1A:
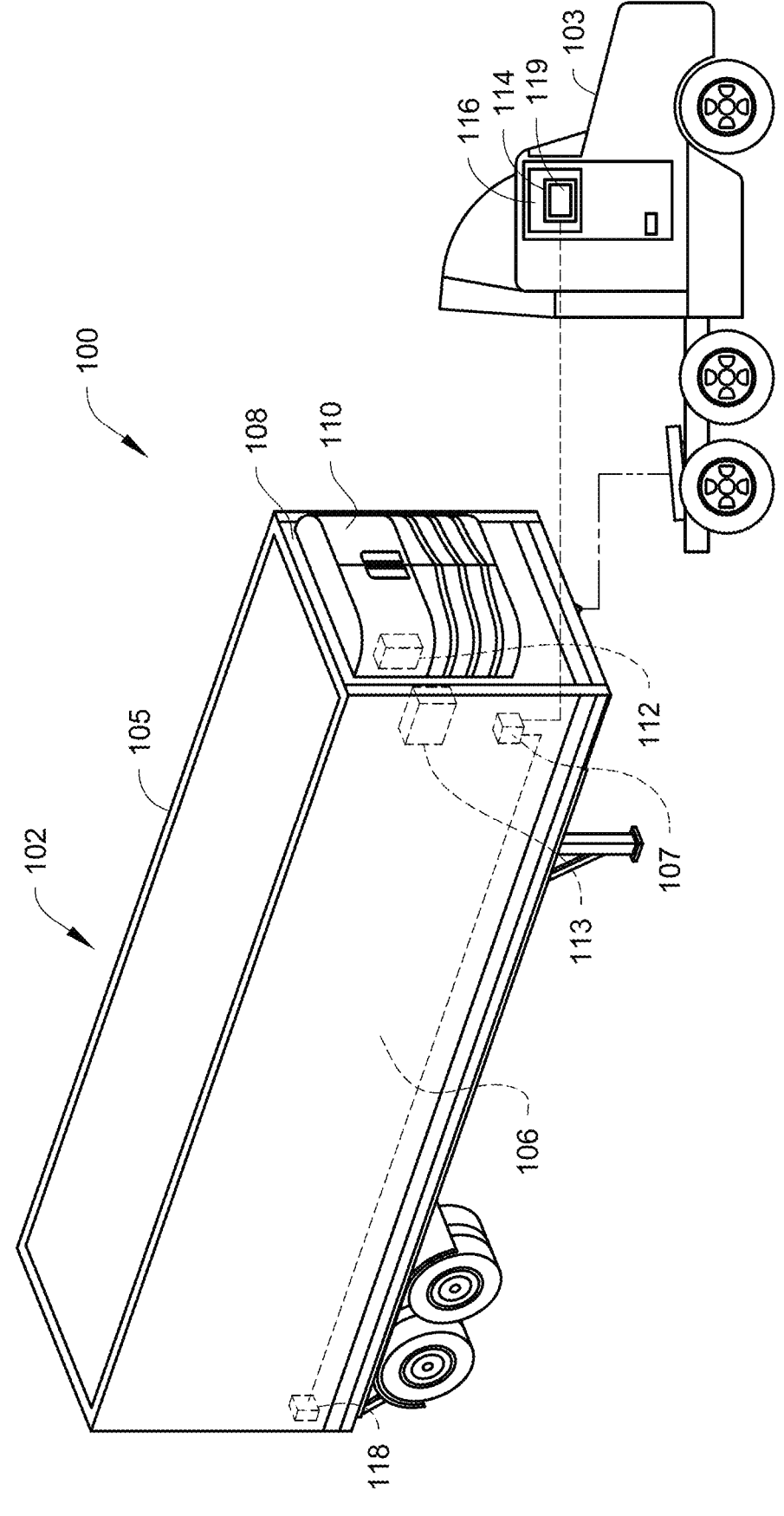
FIG. 1A illustrates a perspective view of a climate controlled transport unit, with a transport climate control system, attached to a tractor, according to one embodiment.

FIG. 1A illustrates one embodiment of a climate controlled transport unit 102 attached to a tractor 103. The climate controlled transport unit 102 includes a transport climate control system 100 for a transport unit 105. The tractor 103 is attached to and is configured to tow the transport unit 105. The transport unit 105 shown in FIG. 1A is a trailer. It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, a bus, or other similar transport unit), etc.

The transport climate control system 100 includes a climate control unit (CCU) 110 that provides environmental control (e.g. temperature, humidity, air quality, etc.) within a climate controlled space 106 of the transport unit 105. The transport climate control system 100 also includes a programmable climate controller 107 and one or more sensors (not shown) that are configured to measure one or more parameters of the transport climate control system 100 (e.g., an ambient temperature outside of the transport unit 105, a space temperature within the climate controlled space 106, an ambient humidity outside of the transport unit 105, a space humidity within the climate controlled space 106, etc.) and communicate parameter data to the climate controller 107.

The CCU 110 is disposed on a front wall 108 of the transport unit 105. In other embodiments, it will be appreciated that the CCU 110 can be disposed, for example, on a rooftop, under a floor of the transport unit 105, or on another wall of the transport unit 105. The CCU 110 includes a transport climate control circuit (see FIG. 2) that connects, for example, a compressor, a condenser, an evaporator and an expansion valve to provide conditioned air within the climate controlled space 106.

The climate controller 107 may comprise a single integrated control unit 112 or may comprise a distributed network of climate controller elements 112, 113. The number of distributed control elements in a given network can depend upon the particular application of the principles described herein. The climate controller 107 is configured to control operation of the transport climate control system 100 including the transport climate control circuit.

A human-machine interface (HMI) 114 may be included in a cabin 116 of tractor 103. The HMI may include a display 119. HMI 114 includes a user input, for example a touchscreen, keypad, keyboard, track pad or ball, mouse, microphone configured to receive voice commands, or the like. The HMI 114 can be configured to prompt a user for one or more parameters. The HMI 114 receives input of the one or more parameters via the user input. The one or more parameters may include, for example, the contents of the load in a climate controlled space, a set point for the climate controlled space, an ambient temperature, a time to complete a pulldown operation, or the like. In an embodiment, the HMI 114 is a mobile device such as a smart phone including an application configured to accept input of the parameters. In an embodiment, the HMI 114 is an in-dashboard navigation system.

The HMI 114 is operatively connected to the climate controller 107. The operative connection may be wired or wireless communications, for example according to a controller area network (CAN) bus, BLUETOOTH™, 802.11 WiFi, or other such standards and using corresponding hardware. The climate controller 107 is configured to receive the one or more parameters from HMI 114. The climate controller 107 is configured to determine a pulldown operation to achieve a desired set point temperature for the climate controlled space 106, based on the one or more parameters. The pulldown operation determined by climate controller 107 can include a lubricant recovery operation, such as operating under conditions that allow for lubricant recovery for a time, such as operating at moderate speeds, capacities, or other such operating parameters.

The climate controller 107 is configured to compare an estimated time to achieve a set point temperature when operating at a full capacity to an estimated time to achieve the set point temperature when including the lubricant recovery operation. The estimated times can be based on the parameters such as ambient temperature, temperature within the climate controlled space 106, and/or any other suitable parameters such as solar intensity, properties of the climate control unit, and the like. The comparison can be used to determine if it is possible to achieve the set point or to do so within a required time while incorporating the lubricant recovery operation into the pulldown operation to reach the set point temperature.

The climate controlled transport unit 102 can include door sensor 118 located at a door (not shown) of the climate controlled space 106 and configured to determine whether the door of climate controlled space 106 is open or closed. Door sensor 118 may be, for example, a mechanical, electrical, or optical sensor. Door sensor 118 may be in communication with the climate controller 107, for example via wired or wireless communications.

Figure 1B:
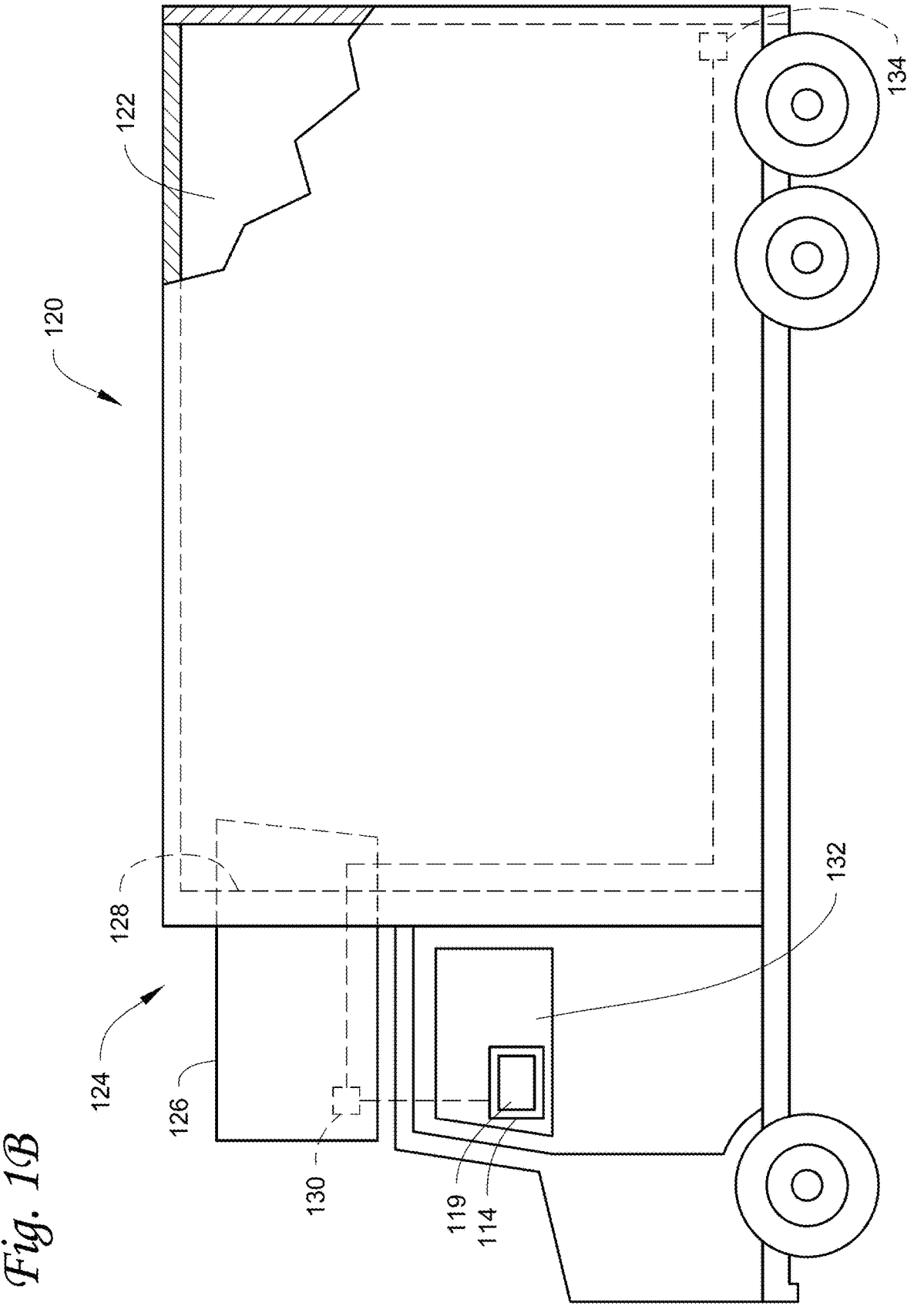
FIG. 1B illustrates a side view of a truck with a transport climate control system, according to one embodiment.

FIG. 1B depicts a temperature-controlled straight truck 120 that includes a climate controlled space 122 for carrying cargo and a transport climate control system 124. The transport climate control system 124 includes a CCU 126 that is mounted to a front wall 128 of the load space 112. The CCU 126 is controlled via a climate controller 130 to provide climate control within the climate controlled space 122. The CCU 126 can include, amongst other components, a transport climate control circuit (see FIG. 2) that connects, for example, a compressor, a condenser, an evaporator and an expansion valve to provide climate control within the climate controlled space 122. CCUs 126 according to embodiments can further include an economizer, multiple condenser segments, multiple evaporators, and any suitable valves and/or fans, for example for a multi-zone CCU 126.

The transport climate control system 124 also includes a programmable climate controller 130 and one or more sensors (not shown) that are configured to measure one or more parameters of the transport climate control system 124 (e.g., an ambient temperature outside of the truck 120, a space temperature within the climate controlled space 122, an ambient humidity outside of the truck 120, a space humidity within the climate controlled space 122, etc.) and communicate parameter data to the climate controller 130. The climate controller 130 is configured to control operation of the transport climate control system 124 including the transport climate control circuit.

The straight truck 120 can include an HMI 114 as described above with respect to FIG. 1A, that is located in the cabin 132 and operatively connected to the climate controller 130.

The straight truck 120 can include a door sensor 134 located at a door (not shown) of the climate controlled space 122 and configured to determine whether the door (not shown) of climate controlled space 122 is open or closed. Door sensor 134 may be, for example, a mechanical, electrical, or optical sensor. Door sensor 134 is in communication with the climate controller 130, for example via a wired or wireless communication.

Figure 1C:
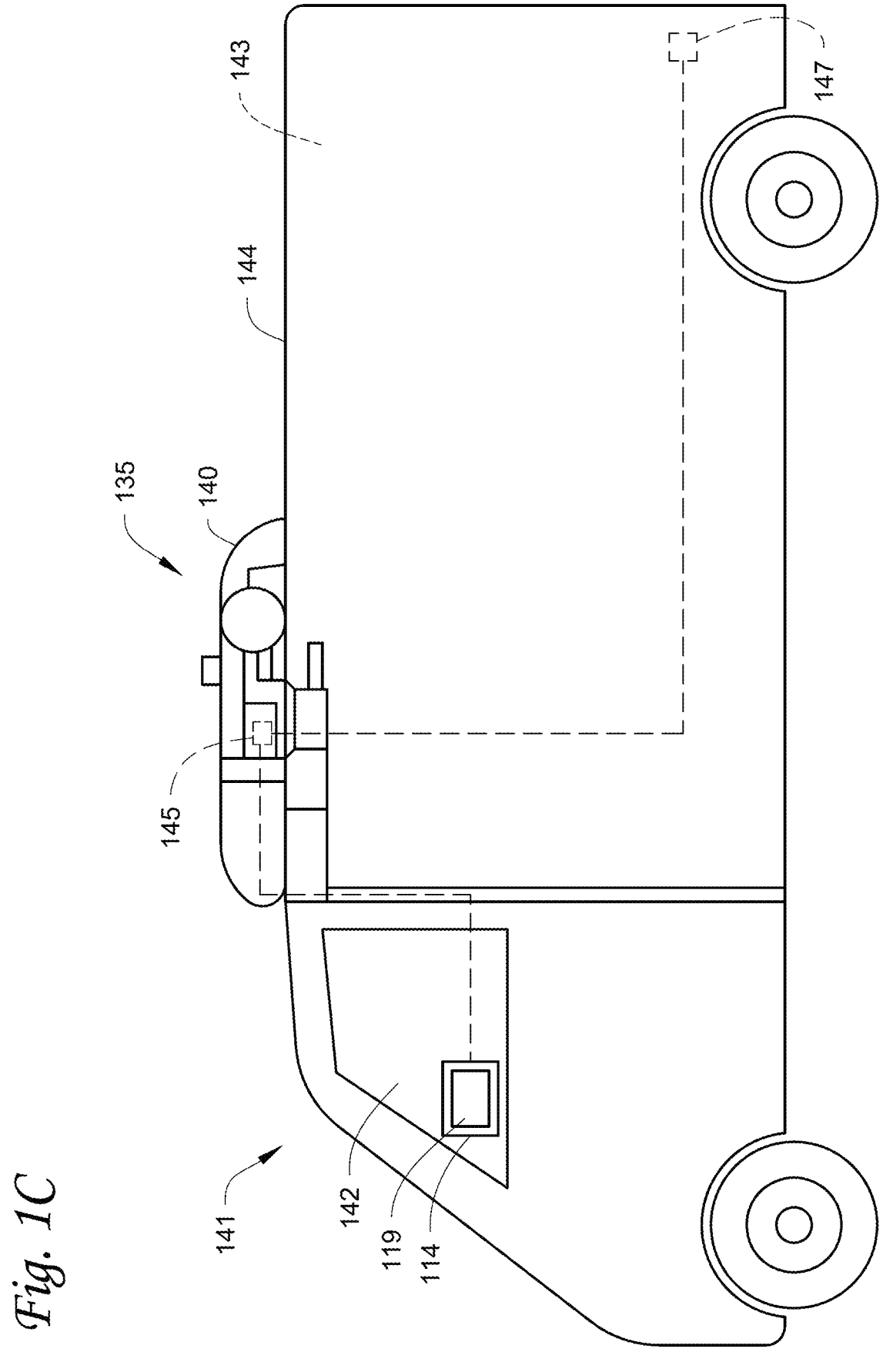
FIG. 1C illustrates a side view of a van with a transport climate control system, according to one embodiment.

FIG. 1C depicts a temperature-controlled van 141 that includes a climate controlled space 143 for carrying cargo and a transport climate control system 135 for providing climate control within the climate controlled space 143. The transport climate control system 135 includes a CCU 140 that is mounted to a rooftop 144 of the climate controlled space 143. The transport climate control system 135 can include, amongst other components, a transport climate control circuit (see FIG. 2) that connects, for example, a compressor, a condenser, an evaporator and an expansion valve to provide climate control within the climate controlled space 143.

The transport climate control system 135 also includes a programmable climate controller 145 and one or more sensors (not shown) that are configured to measure one or more parameters of the transport climate control system 135 (e.g., an ambient temperature outside of the van 141, a space temperature within the climate controlled space 143, an ambient humidity outside of the van 141, a space humidity within the climate controlled space 143, etc.) and communicate parameter data to the climate controller 145. The climate controller 145 is configured to control operation of the transport climate control system 135 including the transport climate control circuit.

The temperature controlled van 141 can include an HMI 114 that is located in a cabin 142 of the temperature controlled van 141. The climate controller 145 is in communication with the HMI 114.

The temperature controlled van 141 can include a door sensor 147 located at a door (not shown) of the climate controlled space 143 and configured to determine whether the door (not shown) of climate controlled space 143 is open or closed. Door sensor 147 may be, for example, a mechanical, electrical, or optical sensor. Door sensor 147 is in communication with the climate controller 145, for example via a wired or wireless communication.

Figure 1D:
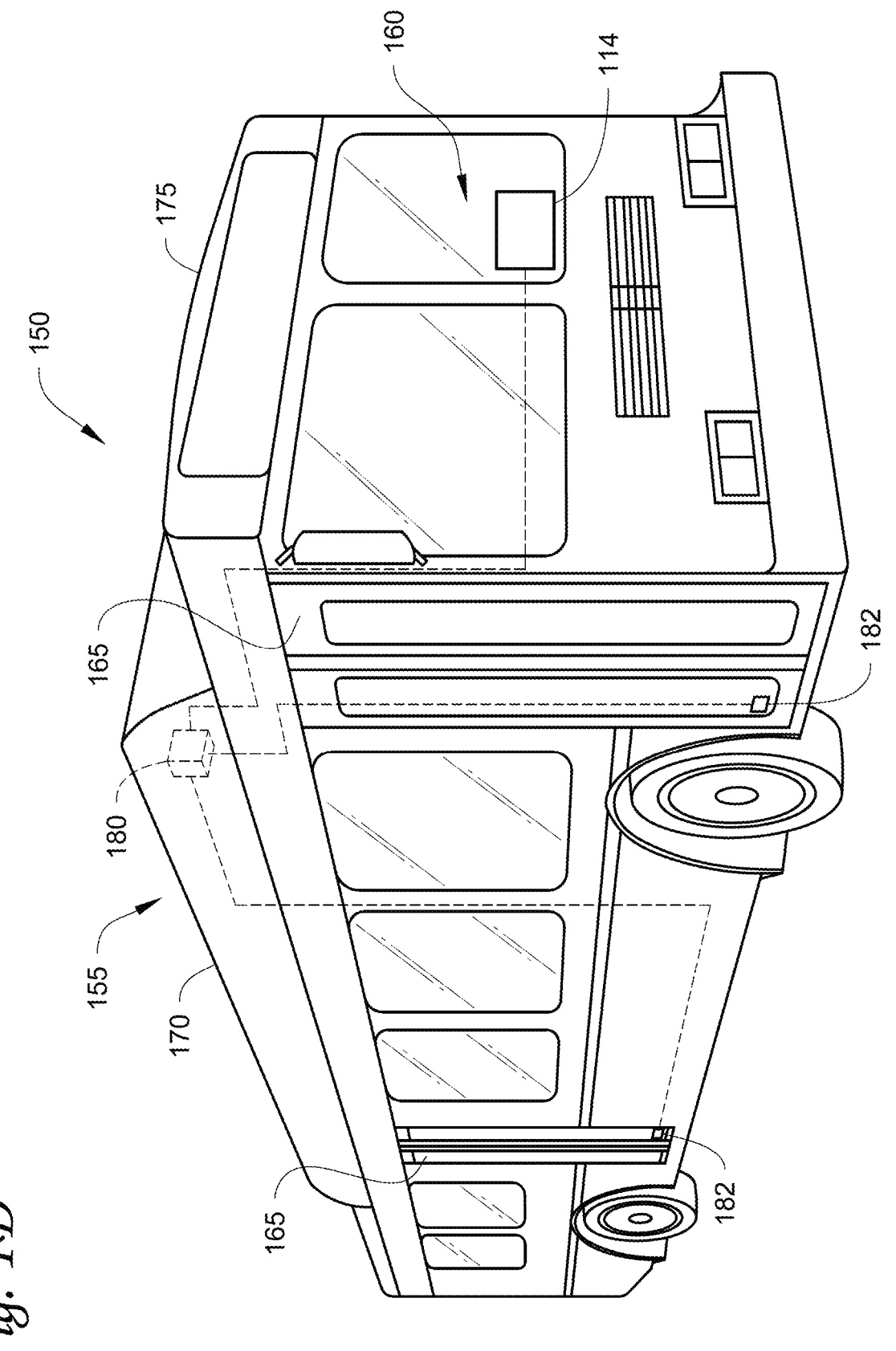
FIG. 1D illustrates a perspective view of a passenger vehicle including a transport climate control system, according to one embodiment.

FIG. 1D is a perspective view of a vehicle 150 including a transport climate control system 155, according to one embodiment. The vehicle 150 is a mass-transit bus that can carry passenger(s) (not shown) to one or more destinations. In other embodiments, the vehicle 150 can be a school bus, railway vehicle, subway car, or other commercial vehicle that carries passengers. The vehicle 150 includes a climate controlled space (e.g., passenger compartment) 160 supported that can accommodate a plurality of passengers. The vehicle 150 includes doors 165 that are positioned on a side of the vehicle 150. In the embodiment shown in FIG. 1D, a first door 165 is located adjacent to a forward end of the vehicle 150, and a second door 165 is positioned towards a rearward end of the vehicle 150. Each door 165 is movable between an open position and a closed position to selectively allow access to the climate controlled space 160. The transport climate control system 155 includes a CCU 170 attached to a roof 175 of the vehicle 150.

The CCU 170 includes a transport climate control circuit (not shown) that connects, for example, a compressor, a condenser, an evaporator and an expansion device to provide conditioned air within the climate controlled space 160. The transport climate control system 155 also includes a programmable climate controller 180 and one or more sensors (not shown) that are configured to measure one or more parameters of the transport climate control system 155 and communicate parameter data to the climate controller 180. The climate controller 180 may comprise a single integrated control unit or may comprise a distributed network of climate controller elements. The number of distributed control elements in a given network can depend upon the particular application of the principles described herein. The climate controller 180 is configured to control operation of the transport climate control system 155 including the HVAC circuit.

The vehicle 150 can include an HMI 114 as described above with respect to FIG. 1A within the climate controlled space 160. The HMI 114 can be viewable, for example, from the driver's seat (not shown). The climate controller 180 is in communication with the HMI 114.

The vehicle 150 can include door sensors 182, positioned, for example, at each of doors 165 and configured to determine whether any of doors 165 are open or closed. Door sensors 182 may be, for example, mechanical, electrical, or optical sensors. The door sensors 182 are in communication with the climate controller 180, for example via a wired or wireless communication.

Figure 2:
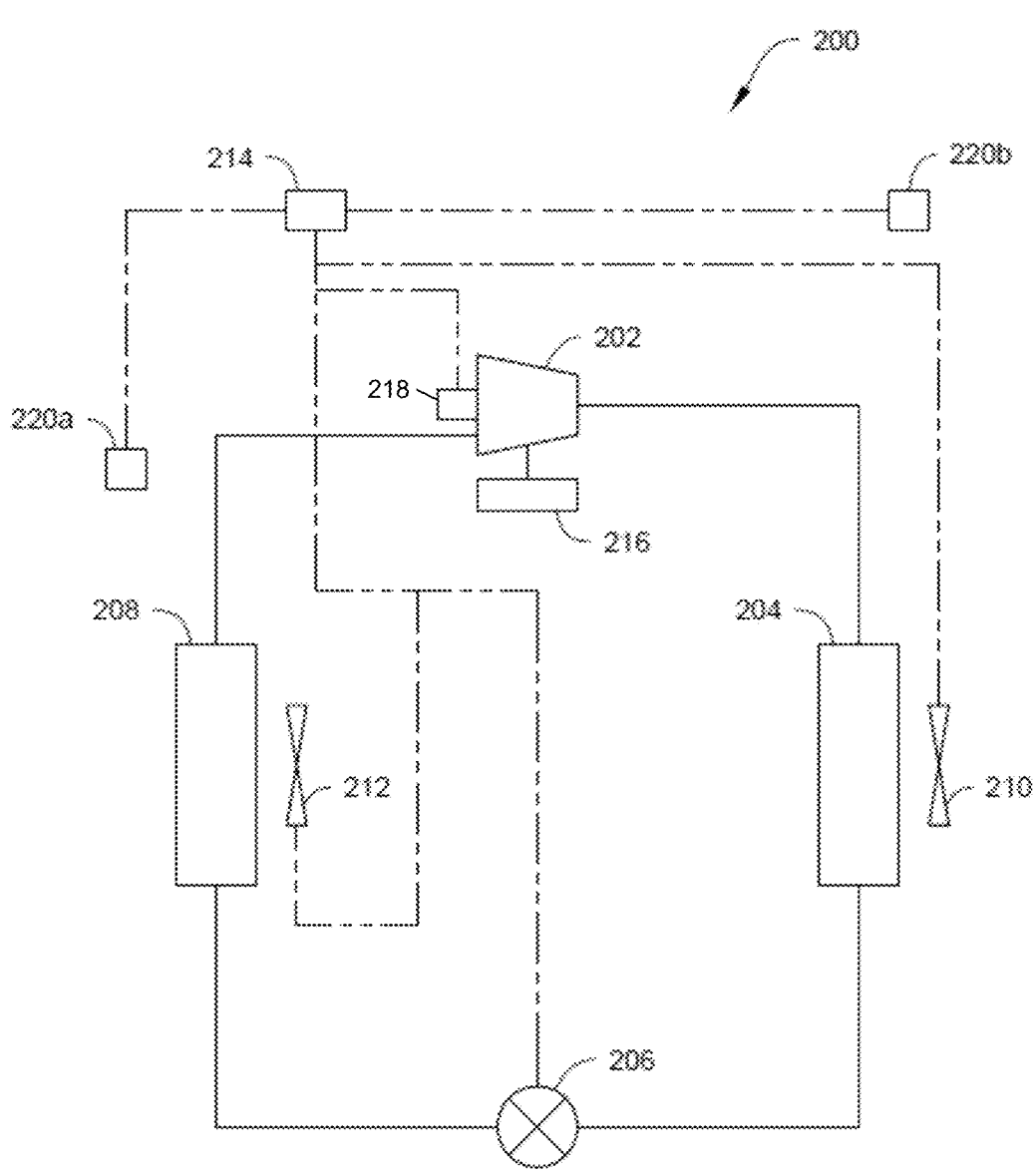
FIG. 2 illustrates a schematic of a working fluid circuit of a transport climate control system according to one embodiment.

FIG. 2 illustrates a schematic of a working fluid circuit 200 of a transport climate control system according to one embodiment. Working fluid circuit 200 can be included, for example, as the climate control circuit used in CCUs 110, 126, 140, or 170 as discussed above and shown in FIGS. 1A-1D. Working fluid circuit 200 includes compressor 202, condenser 204, expander 206, and evaporator 208. Working fluid circuit 200 can optionally further include condenser fans 210 and/or evaporator fans 212. The working fluid circuit 200 further includes a controller 214. Working fluid circuit 200 also includes a lubricant sump 216.

Working fluid circuit 200 is configured to provide conditioned air to a climate controlled space, such as one or more spaces within a trailer, a straight truck, a van, a transit vehicle, or any other suitable climate controlled space of a vehicle.

Compressor 202 can be any suitable compressor for compressing the working fluid circulated in working fluid circuit 200. Compressor 202 can be a centrifugal, rotary, scroll, or other such compressor. In an embodiment, compressor 202 is a variable speed compressor, for example including a variable frequency drive 218. Variable frequency drive 218 can control the speed at which compressor 202 is operated, for example by varying the frequency of input electricity to the compressor 202. In an embodiment, compressor 202 can be an electrically powered compressor. In other embodiments, compressor 202 can be configured to be operated by a prime mover, or use any other suitable power source for operations. In some embodiments, compressor 202 can include the lubricant sump 216 or lubricant sump 216 can be connected to the compressor 202 such that lubricant is provided at one or more bearings of said compressor 202. The compressor 202 can take up lubricant from lubricant sump 216 during operation, for example when the compressor 202 is started up. In an embodiment, the operation of the compressor circulates the lubricant such that lubricant is returned to lubricant sump 216 as a result of the operation of compressor 202. The circulation of lubricant can be dependent on the operational state of the compressor 202, for example the respective suction and discharge temperatures, the capacity that the compressor 202 is being operated at, the speed at which compressor 202 is being operated at, and/or the like.

Condenser 204 is a heat exchanger configured to exchange heat between the working fluid from compressor 202 and an ambient environment, such that the working fluid can be condensed as the ambient environment absorbs heat from the working fluid. Optionally, one or more condenser fans 210 can be provided at or near condenser 204 to direct airflow over the condenser 204 so as to facilitate heat exchange between the working fluid and the ambient environment. The one or more condenser fans 210 can optionally be controlled based on the operational state of the compressor 202.

Expander 206 can be any suitable expander for expanding the working fluid. Expander 206 can be positioned downstream of the condenser 204 and upstream of the evaporator 208. Expander 206 can include any of one or more expansion valves, expansion orifices, orifice plates, or any other such suitable expansion structures. In an embodiment, expander 206 can include a controllable expander such as an electronic expansion valve (EXV). In an embodiment, expander 206 can optionally be controlled based on the operational state of the compressor 202.

Evaporator 208 is a heat exchanger configured to exchange heat between the working fluid and air in or that will be provided to the climate controlled space, so as to condition (e.g., cool) air directed to the climate controlled space. The evaporator 208 can be any suitable heat exchanger configured such that the working fluid, having been expanded at the expander 206, can absorb heat from the air in or that will be provided to the climate controlled space. Optionally, one or more evaporator fans 212 can be provided to direct airflow over the evaporator 208 so as to facilitate heat exchange between the working fluid and the air in or to be provided to the climate controlled space, and/or to direct air flow into the climate controlled space or through ducts conveying air flow into the climate controlled space. The one or more evaporator fans 212 can optionally be controlled based on the operational state of the compressor 202.

Controller 214 is configured to operate the working fluid circuit 200, for example through control of compressor 202 and optionally one or more of expander 206, one or more condenser fans 210, one or more evaporator fans 212, and/or any other valves or flow controls provided in working fluid circuit 200. Controller 214 can optionally be connected to one or more temperature sensors 220*a,b* or other suitable sources of temperature information such as weather services providing ambient temperatures or estimates thereof and the like. The temperature sensors 220*a,b* can include a climate controlled space temperature sensor 220*a* provided in the climate controlled space and configured to provide controller 214 with the temperature from the climate controlled space. The temperature sensors 220*a,b* can optionally also include an ambient temperature sensor 220*b* provided such that the ambient temperature can be measured by said ambient temperature sensor 220*b*. The controller 214 can be configured to receive a set point for the climate controlled space, for example from a user input such as from a mobile device, the HMI 114 as described above and shown in FIGS. 1A-1D, a telematics system, or any other suitable source. The controller 214 can further be configured to receive the temperature of the climate controlled space, for example from climate controlled space temperature sensor 220*a* and to receive an ambient temperature from, for example, a weather service, from ambient temperature sensor 220*b*, or the like. The controller 214 can be configured to determine, based on at least the temperature of the climate controlled space and the ambient temperature, a time to achieve the set point when operating at a full or maximum capacity. The determination can further be based on operating characteristics of working fluid circuit 200. The controller 214 can further be configured to determine, based on at least the temperature of the climate controlled space and the ambient temperature, a time to achieve the set point when operating with a lubricant recovery operation prior to achieving the set point. The determination can include a determination of when to operate in the lubricant recovery operation during the pulldown to the set point, a duration of the lubricant recovery operation, particular operating conditions for the lubricant recovery operation such as discharge or suction temperatures, compressor speed, or the like. In an embodiment, the lubricant recovery operation can be performed towards an end of the pulldown operation, for example when the temperature approaches the set point, with the lubricant recovery operation being between the pulldown mode and a maintenance mode at the set point. In an embodiment, the pulldown operation and the lubricant recovery operation are determined and/or controlled such that the temperature of the climate controlled space does not overshoot the set point during the pulldown mode and the lubricant recovery mode.

In an embodiment, the controller 214 can be configured to select the full or maximum capacity operation or operation including the lubricant recovery operation based on the ability to meet the set point, or to meet the set point within a given period of time. The controller 214 can further be configured to operate working fluid circuit 200, for example to perform the pulldown operation, for example including the lubricant recovery operation.

Figure 3:
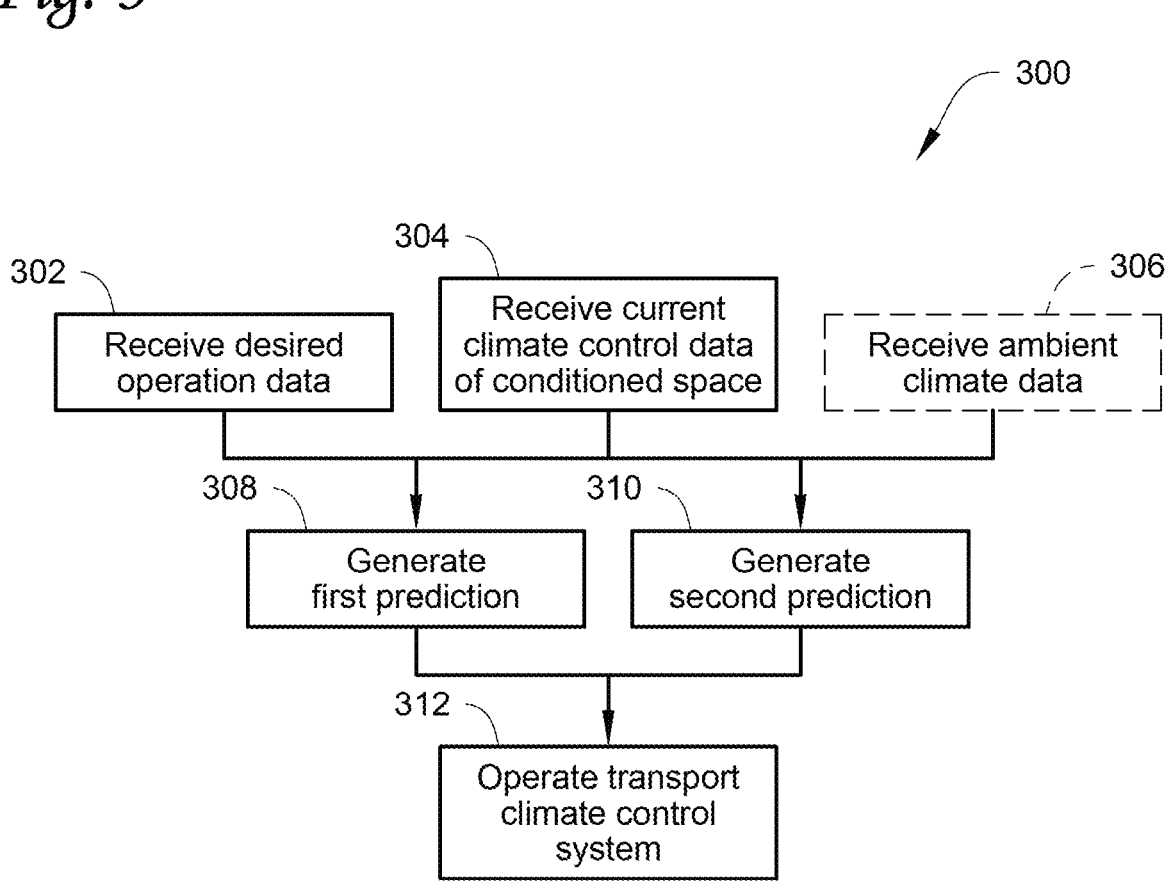
FIG. 3 illustrates a flowchart of a method for operating a transport climate control system according to one embodiment.

FIG. 3 illustrates a flowchart of a method for operating a transport climate control system according to one embodiment. Method 300 includes receiving a desired operation data of the transport climate control data 302, receiving current climate control data of a climate controlled space 304, and optionally receiving ambient climate data at 306. Method 300 further includes generating a first prediction at 308, generating a second prediction at 310, and operating the transport climate control system at 312. In an embodiment, method 300 can be performed on working fluid circuit 200 including controller 214 as described above and shown in FIG. 2.

Method 300 is a method for controlling a transport climate control system. Method 300 controls the operation of the transport climate control system to incorporate operations including a lubricant recovery operation. The lubricant recovery operation is operation in a suitable operating condition for a period of time to return lubricant to the lubricant sump of the compressor. This can prevent the lubricant sump from becoming depleted by high-intensity operations followed by periods where the transport climate control system is shut off or operated at conditions having a low lubricant circulation rate.

Desired operation data of the transport climate control system is received at 302. The desired operation data can include a set point such as, for example, a desired temperature for the climate controlled space serviced by the transport climate control system, such as a cargo compartment of a truck, a space within a trailer, or the like. Receiving the desired operation data at 302 can initiate a pulldown operation of the transport climate control system to achieve a desired temperature set point. The desired operation data is received at a controller, such as the controller 214 described above and shown in FIG. 2. The desired operation data can be received by the controller from any suitable source, such as input from a person such as the driver, the load owner, or the like, received from another system such as a telematics system, a human machine interface (HMI) on the climate control unit, or from any other suitable source for desired operation data for the climate controlled space. In an embodiment, the desired operation data can include a set point for one zone, segment or portion of the climate controlled space. In an embodiment, the desired operation data can include a set point for each of one or more zones, segments or portions of the climate controlled space. In an embodiment, the desired operation data is associated with a load to be placed into the climate controlled space, such as a temperature for frozen items, a temperature for refrigerated items, suitable temperatures for sensitive cargos such as medicines or the like. In an embodiment, the desired operation data can also include a time by which to achieve a set point can also be received at 302.

Current climate control data of the climate controlled space is received at 304. The current climate control data of the climate controlled space can be received by the controller at 304. The current climate control data of the climate controlled space can be received from any suitable source, such as one or more sensors disposed within or near the climate controlled space. In some embodiments, the current climate control data can include a temperature within the climate controlled space. In these embodiments, one or more temperature sensors can be disposed in and around the climate controlled space and connected to the controller, such as temperature sensor 220a described above and shown in FIG. 2.

Optionally, ambient climate data is received at 306. The ambient climate data can be received by the controller at 306. The ambient climate data can be received from any suitable source, such as one or more sensors disposed outside of the climate controlled space such as being located on an exterior of the transport unit including the climate controlled space. In some embodiments, the ambient climate data can include an ambient temperature. In these embodiments, one or more temperature sensors located on an exterior of the transport unit and connected to the controller, such as temperature sensor 220b described above and shown in FIG. 2. In an embodiment, the ambient climate data received can be received at 306 from another source such as a weather service or any other suitable source of temperature information for the area where the transport unit is or will be located during the pulldown operation.

A first prediction of the time to achieve the set point is made at 308. The first prediction at 308 can be made by the controller. The first prediction made at 308 is a prediction based on the assumption of operating the transport climate control system at or near a full or maximum capacity to achieve the desired operation data (e.g., a desired temperature setpoint for the climate controlled space) received at 302. The first prediction at 308 can be based on the current climate control data (e.g., a current temperature within the climate controlled space) received at 304 and the ambient climate data (e.g., an ambient temperature external the transport unit) received at 306. In an embodiment, the first prediction at 308 can further be based on one or more additional parameters such as characteristics of the transport climate control system, predicted door openings for the climate controlled space, insulation characteristics of the climate controlled space, and the like. The first prediction can be used to determine an amount of time needed to achieve a set point. The results of the first prediction can be compared to a desired completion time or period of time within which the desired operation data is to be reached. In an embodiment, the first prediction can be used to determine whether the desired operation data can be achieved while incorporating a working fluid (e.g., refrigerant) recovery mode. In an embodiment, the first prediction can be used to determine the implementation of the lubrication recovery operation such that the desired operation data is achieved without being overshot by performance of the oil recovery mode prior to maintaining said desired operation data.

A second prediction of the time to achieve the desired operation data (e.g., a desired temperature setpoint for the climate controlled space) is made at 310. The second prediction at 310 can be made by the controller. The second prediction made at 310 is a prediction based on the assumption of operating the transport climate control system to achieve the desired operation data received at 302 while also including a lubricant recovery operation. The lubricant recovery operation incorporated into the second prediction at 310 can be operation of the transport climate control system in any suitable operation for providing lubricant circulation so as to return lubricant to a lubricant sump of the compressor. The lubricant recovery operation can include maintaining at least a minimum lubricant circulation rate for a sufficient period of time. The lubricant recovery operation can be operation of the transport climate control system at a moderate capacity and/or operating speed for a predetermined period of time sufficient to return lubricant to the sump. The moderate capacity and/or operating speed can be selected based on the characteristics of the transport climate control system, such as line velocities that provide desirable levels of lubricant return. The moderate capacity and/or operating speed can be below a capacity and/or operating speed of the transport climate control system where the compressor discharges too much oil to facilitate return of lubricant to the sump. The return of lubricant to the sump can be sufficient to prepare the transport climate control system for a subsequent pulldown operation. The lubricant recovery operation can be incorporated into the pulldown operation at any suitable part of the pulldown operation for the purpose of making the prediction at 310. In an embodiment, the lubricant recovery operation is incorporated at an end of the pulldown operation, as the predicted temperature of the climate controlled space nears and/or has achieved the desired operation data. The second prediction at 310 can be based on the current climate control data (e.g., a current temperature within the climate controlled space) of the climate controlled space received at 304 and the ambient climate data (e.g., an ambient temperature) received at 306. In an embodiment, the second prediction at 310 can further be based on one or more additional parameters such as characteristics of the transport climate control system, predicted door openings for the climate controlled space, insulation characteristics of the climate controlled space, and the like. The desired operation data itself, such as set point temperatures, can affect lubricant loss characteristics of the system. For example, colder set point temperatures can have lower lubricant loss when close to the set point in comparison to lubricant loss when operating to achieve a higher set point temperatures. In an embodiment, the second prediction at 310 can indicate that the desired operation data cannot be achieved when incorporating the lubricant recovery operation, for example where there are conditions such as high ambient temperatures, numerous door openings, a short period of time to achieve the set point, combinations thereof, or the like.

The transport climate control system is operated at 312. The operation of the transport climate control at 312 can be directed by the controller according to the first and second predictions respectively made at 308 and 310. In an embodiment, if it is indicated in the second prediction at 310 that the desired operation data cannot be achieved while the first prediction at 308 indicates that the climate controlled space can be pulled down according to the desired operation data received at 302, the transport climate control system can be operated at 312 at or near the full or maximum capacity to pull a temperature of the climate controlled space down to the desired operation data received at 302. If the second prediction at 310 indicates that a pulldown operation including the lubricant recovery operation allows the desired operation data received at 302 to be satisfied, the controller can include operating the transport climate control at 312 including the lubricant recovery operation. The lubricant recovery operation carried out at 312 can be the lubricant recovery operation as used in the second prediction at 310. The lubricant recovery operation can include maintaining at least a minimum lubricant circulation rate for a sufficient period of time. The lubricant recovery operation can be operation of the transport climate control system at a moderate capacity and/or operating speed for a predetermined period of time sufficient to return lubricant to the sump. The return of lubricant to the sump can be sufficient to prepare the transport climate control system for a subsequent pulldown operation. The lubricant recovery operation can be incorporated into the pulldown operation at any suitable part of the pulldown operation, for example at the end of the pulldown operation performed at 312 as the climate control data of the climate controlled space nears or reaches the desired operation data received at 302. Operation of the transport climate control system at 312 can optionally include further maintenance of the climate controlled space at the set point following the completion of the pulldown operation by reaching said desired operation data.

Aspects:

It is understood that any of aspects 1-5 can be combined with any of aspects 6-12 or 13-17. It is understood that any of aspects 6-12 can be combined with any of aspects 13-17.

Aspect 1. A controller for a transport climate control system, the controller configured to:

receive a temperature of a climate controlled space and a set point for the climate controlled space;

generate a first prediction of a first time to achieve the set point based on the temperature of the climate controlled space and operation of the transport climate control system at a maximum capacity;

generate a second prediction of a second time to achieve the set point based on the temperature of the climate controlled space and operation of the transport climate control system including a lubricant recovery operation, the lubricant recovery operation including operating the transport climate control system at a selected capacity, the selected capacity being less than the maximum capacity and the selected capacity selected to return lubricant to a sump of the transport climate control system; and operate the transport climate control system, wherein operating the transport climate control system includes the lubricant recovery operation.

Aspect 2. The controller according to aspect 1, wherein the lubricant recovery operation includes a compressor speed determined based on an oil circulation rate in the transport climate control system associated with said compressor speed.

Aspect 3. The controller according to any of aspects 1-2, wherein the controller is configured to operate the transport climate control system according to the lubricant recovery operation at an end of a pulldown operation.

Aspect 4. The controller according to any of aspects 1-3, wherein the controller is configured to interface with a variable speed drive of a compressor of the transport climate control system.

Aspect 5. The controller according to any of aspects 1-4, wherein the controller is further configured to receive an ambient temperature, the generating of the first prediction is further based on the ambient temperature, and the generating of the second prediction is further based on the ambient temperature.

Aspect 6. A transport climate control system, comprising:

a compressor; and a controller, the controller configured to:

receive a temperature of a climate controlled space and a set point for the climate controlled space;

generate a first prediction of a first time to achieve the set point based on the temperature of the climate controlled space and operation of the transport climate control system at a maximum capacity;

generate a second prediction of a second time to achieve the set point based on the temperature of the climate controlled space and operation of the transport climate control system including a lubricant recovery operation, the lubricant recovery operation including operating the transport climate control system at a selected capacity, the selected capacity being less than the maximum capacity and the selected capacity selected to return lubricant to a sump of the transport climate control system; and operate the transport climate control system, wherein operating the transport climate control system includes the lubricant recovery operation.

Aspect 7. The transport climate control system according to aspect 6, further comprising an evaporator, an expander, and a condenser.

Aspect 8. The transport climate control system according to any of aspects 6-7, wherein the compressor is a variable-speed compressor.

Aspect 9. The transport climate control system according to aspect 8, wherein the lubricant recovery operation includes operating the compressor at a compressor speed determined based on an oil circulation rate in the transport climate control system associated with said compressor speed.

Aspect 10. The transport climate control system according to any of aspects 8-9, wherein the controller is configured to interface with a variable speed drive of the compressor.

Aspect 11. The transport climate control system according to any of aspects 6-10, wherein the controller is configured to operate the transport climate control system according to the lubricant recovery operation at an end of a pulldown operation.

Aspect 12. The transport climate control system according to any of aspects 6-11, wherein the controller is further configured to receive an ambient temperature, the generating of the first prediction is further based on the ambient temperature, and the generating of the second prediction is further based on the ambient temperature.

Aspect 13. A method of controlling a transport climate control system, comprising:

receiving, at a controller, a temperature of a climate controlled space and a set point for the climate controlled space;

generating, using the controller, a first prediction of a first time to achieve the set point based on the temperature of the climate controlled space and operation of the transport climate control system at a maximum capacity;

generating, using the controller, a second prediction of a second time to achieve the set point based on the temperature of the climate controlled space and operation of the transport climate control system including a lubricant recovery operation, the lubricant recovery operation including operating the transport climate control system at a selected capacity, the selected capacity being less than the maximum capacity and the selected capacity selected to return lubricant to a sump of the transport climate control system; and operating the transport climate control system, wherein operating the transport climate control system includes the lubricant recovery operation.

Aspect 14. The method according to aspect 13, wherein the lubricant recovery operation includes operating the compressor at a compressor speed determined based on an oil circulation rate in the transport climate control system associated with said compressor speed.

Aspect 15. The method according to aspect 14, wherein operating the transport climate control system includes the controller interfacing with a variable speed drive of a compressor of the transport climate control system so as to direct operation of the compressor at the compressor speed.

Aspect 16. The method according to any of aspects 13-15, wherein the lubricant recovery operation is performed at an end of a pulldown operation.

Aspect 17. The method according to any of aspects 13-16, further comprising receiving, at the controller, an ambient temperature, and wherein generating the first prediction is further based on the ambient temperature, and wherein generating the second prediction is further based on the ambient temperature.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A controller for a transport climate control system, the controller communicatively coupled to a sensor and a compressor, the controller configured to:

receive current climate control data of a climate controlled space from the sensor and desired operation data for the climate controlled space;

generate a first prediction of a first time to achieve the desired operation data based on the current climate control data of the climate controlled space and operation of the transport climate control system at or near a maximum capacity;

generate a second prediction of a second time to achieve the desired operation data based on the current climate control data of the climate controlled space and operation of the transport climate control system including a lubricant recovery operation, the lubricant recovery operation including operating the transport climate control system at a selected capacity, the selected capacity being less than the maximum capacity and the selected capacity selected to return lubricant to a sump of the transport climate control system;

determine, based on the first prediction and the second prediction, whether to perform the lubricant recovery operation; and when it is determined to perform the lubricant recovery operation, direct operation of the transport climate control system including the lubricant recovery operation.

2. The controller of claim 1, wherein the lubricant recovery operation includes a compressor speed determined based on an oil circulation rate in the transport climate control system associated with said compressor speed.

3. The controller of claim 1, wherein the controller is configured to operate the transport climate control system according to the lubricant recovery operation at an end of a pulldown operation.

4. The controller of claim 1, wherein the controller is configured to control a variable speed drive of the compressor of the transport climate control system so as to control an operating speed of the compressor.

5. The controller of claim 1, wherein the controller is further configured to receive an ambient temperature, the generating of the first prediction is further based on the ambient temperature, and the generating of the second prediction is further based on the ambient temperature.

6. The controller of claim 1, wherein the current climate control data includes a temperature of a climate controlled space, wherein the desired operation data for the climate controlled space includes a set point for the climate controlled space, wherein the controller is configured to generate the first prediction of a first time to achieve the set point based on the temperature of the climate controlled space and operation of the transport climate control system at or near a maximum capacity, wherein the controller is configured to generate the second prediction of a second time to achieve the set point based on the temperature of the climate controlled space and operation of the transport climate control system including a lubricant recovery operation, the lubricant recovery operation including operating the transport climate control system at a selected capacity, the selected capacity being less than the maximum capacity and the selected capacity selected to return lubricant to a sump of the transport climate control system.

7. A transport climate control system, comprising:

a sensor;

a compressor; and a controller communicatively coupled to the sensor and the compressor, the controller configured to:

receive a temperature of a climate controlled space from the sensor and a set point for the climate controlled space;

generate a first prediction of a first time to achieve the set point based on the temperature of the climate controlled space and operation of the transport climate control system at or near a maximum capacity;

generate a second prediction of a second time to achieve the set point based on the temperature of the climate controlled space and operation of the transport climate control system including a lubricant recovery operation, the lubricant recovery operation including operating the transport climate control system at a selected capacity, the selected capacity being less than the maximum capacity and the selected capacity selected to return lubricant to a sump of the transport climate control system;

determine, based on the first prediction and the second prediction, whether to perform the lubricant recovery operation; and when it is determined to perform the lubricant recovery operation, direct operation of the transport climate control system including the lubricant recovery operation.

8. The transport climate control system of claim 7, further comprising an evaporator, an expander, and a condenser.

9. The transport climate control system of claim 7, wherein the compressor is a variable-speed compressor.

10. The transport climate control system of claim 9, wherein the lubricant recovery operation includes operating the compressor at a compressor speed determined based on an oil circulation rate in the transport climate control system associated with said compressor speed.

11. The transport climate control system of claim 9, wherein the controller is configured to control a variable speed drive of the compressor so as to control an operating speed of the compressor.

12. The transport climate control system of claim 7, wherein the controller is configured to operate the transport climate control system according to the lubricant recovery operation at an end of a pulldown operation.

13. The transport climate control system of claim 7, wherein the controller is further configured to receive an ambient temperature, the generating of the first prediction is further based on the ambient temperature, and the generating of the second prediction is further based on the ambient temperature.

14. A method of controlling a transport climate control system, comprising:

receiving, at a controller, a temperature of a climate controlled space and a set point for the climate controlled space;

generating, using the controller, a first prediction of a first time to achieve the set point based on the temperature of the climate controlled space and operation of the transport climate control system at a maximum capacity;

generating, using the controller, a second prediction of a second time to achieve the set point based on the temperature of the climate controlled space and operation of the transport climate control system including a lubricant recovery operation, the lubricant recovery operation including operating the transport climate control system at a selected capacity, the selected capacity being less than the maximum capacity and the selected capacity selected to return lubricant to a sump of the transport climate control system;

determine, based on the first prediction and the second prediction, whether to perform the lubricant recovery operation; and when it is determined to perform the lubricant recovery operation, direct operation of the transport climate control system including the lubricant recovery operation.

15. The method of claim 14, wherein the lubricant recovery operation includes operating the compressor at a compressor speed determined based on an oil circulation rate in the transport climate control system associated with said compressor speed.

16. The method of claim 15, wherein operating the transport climate control system includes the controller controlling a variable speed drive of a compressor of the transport climate control system so as to direct operation of the compressor at the compressor speed.

17. The method of claim 14, wherein the lubricant recovery operation is performed at an end of a pulldown operation.

18. The method of claim 14, further comprising receiving, at the controller, an ambient temperature, and wherein generating the first prediction is further based on the ambient temperature, and wherein generating the second prediction is further based on the ambient temperature.

* * * * *